United States Patent

Elslager et al.

[15] 3,668,205
[45] June 6, 1972

[54] BENZYLAMINO QUINAZOLINYL FORMAMIDINE COMPOUNDS

[72] Inventors: Edward F. Elslager; Donald F. Worth, both of Ann Arbor, Mich.

[73] Assignee: Parke, Davis & Company, Detroit, Mich.

[22] Filed: Apr. 20, 1970

[21] Appl. No.: 30,242

[52] U.S. Cl. .................260/256.4 Q, 424/200, 424/251
[51] Int. Cl. ..................................................C07d 51/48
[58] Field of Search ...........................260/256.4 Q

[56] References Cited

UNITED STATES PATENTS

| | | | |
|---|---|---|---|
| 3,149,113 | 9/1964 | Brown | 260/256.4 |
| 3,375,250 | 3/1968 | Kirchner et al. | 260/256.4 |
| 3,505,330 | 4/1970 | Davoll | 260/256.4 |

OTHER PUBLICATIONS

Wagner et al., Synthetic Organic Chemistry, Wiley, N.Y., 1953, pp. 728–729.

Primary Examiner—Alex Mazel
Assistant Examiner—R. J. Gallagher
Attorney—Robert R. Adams, David B. Ehrlinger, George M. Richards and Edward J. Gall

[57] ABSTRACT

Benzylamino quinazolinyl formamidine compounds (I) and their acid salts

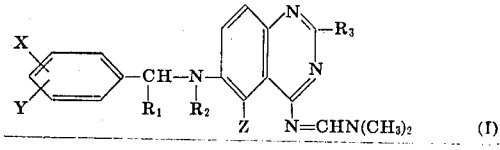

are provided by amidination of the corresponding 2,4-diamino or 2-amino-4-dimethylamidino compounds where $R_1$ is hydrogen or methyl; $R_2$ is hydrogen, nitroso, formyl, acetyl, propionyl or lower alkyl; $R_3$ represents amino or dimethylformamidino; and X, Y and Z are hydrogen, chloro or methyl. The compounds are pharmacological agents having useful antiparasitic properties, especially antimalarial properties.

6 Claims, No Drawings

BENZYLAMINO QUINAZOLINYL FORMAMIDINE COMPOUNDS

SUMMARY AND DETAILED DESCRIPTION

This invention relates to novel chemical compounds and to means of producing the same. More particularly, the invention relates to benzylamino quinazolinyl formamidine compounds having in free base form the formula

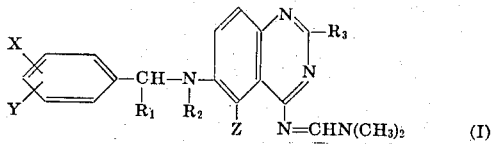

and acid addition salts thereof where $R_1$ is hydrogen or methyl; $R_2$ is hydrogen, nitroso, formyl, acetyl, propionyl, or $C_1$ to $C_3$ alkyl; $R_3$ is amino or dimethylformamidino; and X, Y and Z are the same or different and represent hydrogen, chloro or methyl.

In accordance with the invention the novel benzylamino quinazolinyl formamidine compounds are produced by reacting a 6-benzylamino-2-aminoquinazoline compound of formula

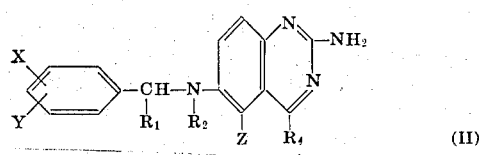

with an amidinating agent where $R_1$, $R_2$, X, Y and Z have the above-specified significance and $R_4$ is amino or dimethylformamidino. For the reaction the amidinating agent may be 1,1-dimethoxytrimethylamine or (chloromethylene)dimethylammonium chloride. The preferred agent is 1,1-dimethoxytrimethylamine; preferably it is used in excess. The reaction conditions are not particularly critical and may be varied over a considerable range at temperatures up to about 100° C. using an inert solvent favoring control of reaction temperature. It is understood that the amidination occurs first at the 4-position and then, when the reaction is carried further, also at the 2-position. Amidination at the 4-position is preferably carried out under mild conditions, for example, at temperatures ranging from room temperature or lower up to about 40° C. An equivalent quantity or moderate excess of the amidinating agent is used. Amidination at the 2-position is preferably carried out under more vigorous conditions at higher temperatures up to about 100° C. The time required for reaction may vary anywhere from about two to three hours to several days depending on reaction temperature, proportion of reactants, and extent of reaction, that is whether a 4- or 2,4-amidination is desired. As indicated, the reaction is carried out in the presence of a non-reactive solvent. Any of a variety of solvents may be used as, for example, ethers such as dioxane, tetrahydrofuran and diethylene glycol dimethyl ether, as well as chlorinated hydrocarbons, aromatic hydrocarbons, amides such as dimethylformamide and mixtures of any such solvents. Dimethyl-formamide is a preferred solvent for the reaction. The reaction product can be isolated from the reaction and purified in any suitable way. When using the free base amidinating agent, for example, the product can be isolated by filtration or concentration of the reaction mixture. If (chloromethylene) dimethylammonium chloride is used, it is preferred to neutralize the reaction mixture by addition of aqueous base and then to separate the product by concentration of the reaction mixture. The product can be purified conveniently by thin layer chromatography using, for example, silica gel plates developed with an eluant mixture such as ethyl acetate: methanol:triethylamine, for example, in the ratio 75:25:1.

The free base compounds of the invention form acid addition salts upon reaction with organic and inorganic acids. Some examples of the acid addition salts of the invention are the inorganic acid salts such as the hydrochloride, hydrobromide, hydroiodide, sulfate and phosphate, and organic acid salts such as the acetate, citrate, p-toluenesulfonate and sulfamate as well as salts with dibasic acids such as methylenebis(hydroxy naphthoic acid). The salts can be formed in any convenient way, for example, by mixing the free base with at least an equivalent amount of the chosen acid in a solvent in which the salt is insoluble, particularly at low temperature, thereby permitting recovery of the desired salt in the solid phase. Similarly, the free base compounds can be derived from the salts by treating the same with a basic material. The invention contemplates the acid salts broadly. Those salts which may be unsuited to a particular use, as for example an application where toxicity is a problem, are nevertheless useful as chemical intermediates for the production of non-toxic acid salts by conventional salt-forming procedures. The compounds of the invention also can exist in anhydrous form as well as in solvated form, especially in hydrated form. In general, the hydrated and the solvated form with pharmaceutically acceptable solvents are equivalent to the anhydrous or unsolvated form for purposes of the invention.

The products of the invention possess significant pharamacological properties as demonstrated in art-recognized standard tests. In particular, the products of the invention possess antimalarial properties at well-tolerated doses and are useful antimalarial agents. As a representative illustration of the activity of the products in this regard, the product of Example 2a which follows, N'-{2-amino-6-[(3,4-dichlorobenzyl)methylamino]-4-quinazolinyl}-N,N-dimethylformamidine, causes 90 percent suppression of parasitemia in mice inoculated with *Plasmodium berghei* when ingested in the diet in a daily oral dose of about 0.5 mg./kg. The test method used to determine suppressive activity is a recognized method. It is carried out in the following manner. Groups of mice are individually inoculated intraperitoneally with fifteen million blood cells parasitized with *P. berghei*. The inoculation is made one day after initiation of treatment of the mice with the test compound. Concurrently, control animals are maintained for which suppressive therapy is intentionally omitted. The animals, both treated and controls, and maintained for a period and on the sixth day blood samples are taken and Giemsa-stained blood smears are prepared and examined for determination of the percentage of cells parasitized. The antimalarial potency or activity of the test compound is determined by comparison of the mean parasitemia of each treated group with that of a corresponding control group. From these results calculation is made of the dosage required for 90 percent suppression of parasitemia.

It will be appreciated that for clinical use the products of the invention can be made up in accordance with well-known pharmacological techniques into compositions having as an essential active ingredient the product of formula I above or an acid addition salt thereof. The compositions can contain one or more pharamacological diluents and/or excipients. If desired, the compositions can be a dosage unit form suitable for a particular mode of administration, the quantity of active ingredient in each dosage unit being such that one or more units is sufficient for each therapeutic administration. The dosage unit may exist, for example, in the form of a tablet, pill, encapsulated powder or the like for oral administration or in the form of a sterile injectable solution or suspension contained in an ampoule for parenteral administration.

The quinazoline starting materials for the process of the invention are as a class known materials. Those members of the class which, however, are specifically novel can be made from known materials by art-recognized synthetic methods. Example 8b which follows is an illustration of the preparation of one such specifically novel starting material.

The invention is illustrated by the following examples.

EXAMPLE 1

A solution of 1.3 g. of 1,1-dimethoxytrimethylamine in 20 ml. of dimethylformamide is added to a slurry of 3.3 g. of 2,4-diamino-6-[(3,4-dichlorobenzyl)amino]quinazoline in 50 ml. of dimethylformamide stirring at room temperature. After 16 hours, an additional 0.6 g. of 1,1-dimethoxytrimethylamine is added and the resulting mixture stirred 2 hours. Concentration in vacuo, followed by trituration of the residue with acetone, yields the product, N'-{2-amino-6-[(3,4-dichlorobenzyl)-amino]-4-quinazolinyl}-N,N-dimethylformamidine; m.p. 206°–207° C. after recrystallization from a methanol-dimethylformamide-water mixture. The same product is obtained using chloromethylene-(dimethylammonium chloride), 0.016 mole, in place of the trimethylamine. Following reaction, the mixture is first neutralized with aqueous ammonia and then worked up as indicated.

EXAMPLE 2 a. A solution of 1.0 g. of 1,1-dimethoxytrimethylamine and 5 ml. of dimethylformamide is added to a slurry of 2.0 g. of 2,4-diamino-6-[(3,4-dichlorobenzyl)methylamino]quinazoline and 5 ml. of dimethylformamide. After stirring 28 hours at room temperature, the mixture is concentrated in vacuo and the residue crystallized from ether to yield the product, N'-{2-amino-6-[(3,4-dichlorobenzyl)methylamino]-4-quinazolinyl}-N,N-dimethylformamidine; m.p. 185°–188° C.

b. By the procedure of paragraph (a) but substituting for the quinazoline starting material 1.6 g. of 6-benzylamino-2,4-diamino-5-methylquinazoline the product obtained is N'-(2-amino-6-benzylamino-5-methyl-4-quinazolinyl)-N,N-dimethylformamidine.

EXAMPLE 3

12.9 G. of 1,1-dimethoxytrimethylamine is added to a solution of 3.63 g. of 2,4-diamino-6-[(3,4-dichlorobenzyl)-nitrosamino]quinazoline in 50 ml. of dimethylformamide. After stirring at room temperature 3 hours, the product is collected by filtration and washed with dimethylformamide and methanol. This product is N'-{2-amino-6-[(3,4-dichlorobenzyl)-nitrosamino]-4-quinazolinyl}-N,N-dimethylformamidine; m.p. 209°–211° C. after recrystallization. Where the quinazoline starting material of this procedure is replaced by 2,4-diamino-6-[(m-methylbenzyl)nitrosamino]quinazoline (2.79 g.) or N-benzyl-N-(2,4-diamino-6-quinazolinyl)acetamide (3.07 g.), the product obtained is respectively N'-{2-amino-6-[(m-methylbenzyl)-nitrosamino]-4-quinazolinyl}-N,N-dimethylformamidine or N-[2-amino-4-{[(dimethylamino)methylene]amino}-6-quinazolinyl]-N-benzylacetamide.

EXAMPLE 4

23.8 G. of 1,1-dimethoxytrimethylamine is added to a slurry of 3.34 g. of 2,4-diamino-6-[(3,4-dichlorobenzyl)amino]quinazoline and 50 ml. of dimethylformamide. After stirring 22 hours at room temperature, an additional 11.9 g. of 1,1-dimethoxytrimethylamine is added and the resulting solution is heated at 55° C. for 4 hours. The mixture is concentrated in vacuo and the residue triturated with ether, yielding as product, N',N'''-{6[(3,4-dichlorobenzyl)amino]-2,4-quinazolinediyl}bis[N,N-dimethylformamidine]; m.p. 190°–194° C. after recrystallization from ethanol.

By replacing the quinazoline starting material with 3.69 g. of 5-chloro-2,4-diamino-6-[(3,4-dichlorobenzyl)amino]-quinazoline, the product obtained by this procedure is N', N'''-{5-chloro-6-[(3,4-dichlorobenzyl)amino]-2,4-quinazolinediyl}bis[N,N-dimethylformamidine].

EXAMPLE 5

1.4 G. of 1,1-dimethoxytrimethylamine is added to a slurry of 2.0 g. of 2,4-diamino-6-[(3,4-dichlorobenzyl)-methylamino]quinazoline and 15 ml. of dimethylformamide. After stirring at room temperature for 2 hours, the mixture is treated with an additional 2.9 g. of 1,1-dimethoxytrimethylamine and then heated to 50° C. for 14 hours. During this interval, further additions of 2.9 g. of 1,1-dimethoxytrimethylamine after 6 hours and 1.4 g. of 1,1-dimethoxytrimethylamine after 12 hours are made. Concentration of the resulting mixture in vacuo, followed by trituration of residue with ether, yields as product, N',N'''-{6-[(3,4-dichlorobenzyl)methylamino]2,4-quinazolinediyl}bis[N,N-dimethylformamidine], monohydrate; m.p. 116°–118° C. after four recrystallizations from ethyl acetate. The acetate salt of the free base is obtained by recrystallizing the product from glacial acetic acid. By replacing the quinazoline starting material with an equivalent amount of 2,4-diamino-6-[(3,4-dichlorobenzyl)nitrosamino)by the above procedure is N', N'''-{6-[(3,4-dichlorobenzyl)nitrosamino]-2,4-quinazolinediyl}bis[N,N-dimethylformamidine].

EXAMPLE 6

A mixture of 1.6 g. of N-(2,4-diamino-6-quinazolinyl)-N-(3,4-dichlorobenzyl)formamide, 0.6 g. of 1,1-dimethoxytrimethylamine and 15 ml. of dimethylformamide is stirred at room temperature 80 hours. Additional portions of 0.3 g. of 1,1-dimethoxy-trimethylamine are added at 48 hours and at 72 hours. A further portion of 0.6 g. of 1,1-dimethoxytrimethylamine is added after 80 hours and the resulting mixture heated at 50° C. for 18 hours. Concentration in vacuo yields the product, N-[2,4-bis{[(dimethylamino)methylene]amino}-6-quinazolinyl]-N-(3,4-dichlorobenzyl)formamide; m.p. 185° C. after recrystallization from acetonitrile.

EXAMPLE 7

A mixture of 0.85 g. of 2,4-diamino-6-[(α-methylbenzyl)-amino]quinazoline, 1.45 g. of 1,1-dimethoxytrimethylamine, and 15 ml. dimethylformamide is stirred at 50°–60° C. for 8 hours. 1.4 G. of 1,1-dimethoxytrimethylamine is added and the resulting mixture is heated on a steam-bath for 2 hours. The residue obtained upon concentration in vacuo is triturated with ether and then crystallized from acetone to yield the product, N',N'''-{6-[(α-methylbenzyl)amino]-2,4-quinazolinediyl}bis[N,N-dimethylformamidine; m.p. 180°–183° C.

EXAMPLE 8 a. A solution of 1,1-dimethoxytrimethylamine (1.0 g.) in dimethylformamide (5 ml.) is added to a mixture of 2,4-diamino-6-[(3,4-dichlorobenzyl)propylamino]quinazoline (2.2 g.) and dimethylformamide (5 ml.). The reaction mixture is stirred for 2 days at room temperature, then concentrated under vacuum, and the residual product is crystallized from ether. The product is N'-{2-amino-6-[(3,4-dichlorobenzyl)propylamino]-4-quinazolinyl}-N,N-dimethylformamidine.

b. The starting material for paragraph (a) above is prepared as follows: A mixture of 23 g. of 3,4-dichlorobenzylpropylamine, 9.1 g. of 5-chloro-2-nitrobenzonitrile and 35 ml. of 2-methoxyethanol is heated at 125° C. for 3 hours and then stirred overnight at room temperature. 5 G. of 3,4-dichlorobenzylpropylamine is added and the resulting mixture heated at 125° for 19 hours. After another 5 g. of 3,4-dichlorobenzylpropylamine are added, the mixture is refluxed 4 hours more. On cooling, the resulting reaction mixture is filtered and its filtrate cooled further to percipitate 5-[(3,4-dichlorobenzyl)propylamino]2-nitrobenzonitrile; m.p. 143°–145° C. after recrystallization from isopropanol.

A solution of 10 g. of stannous chloride dihydrate, 75 ml. of concentrated HCl, and 75 ml. acetic acid is treated dropwise by a hot solution of 5-[(3,4-dichlorobenzyl)propylamino]-2-nitrobenzonitrile (4.5g.) in glacial acetic acid (125 ml.) During addition, the reaction temperature is maintained below 15° C. Upon completion of addition, the reaction mixture is stirred 6 hours, filtered, and the separated solid slurried one hour with excess 2 N sodium hydroxide. The solid is collected by filtration and from isopropanolic hydrogen chloride. Drying overnight in vacuo at 80° yields 5-[(3,4-dichlorobenzyl)propylamino]2-aminobenzonitrile hydrochloride; m.p. 199°–202° C.

A mixture of 4.5 g. of 5-[(3,4-dichlorobenzyl)propylamino-2-aminobenzonitrile hydrochloride and 1.0 g. of cyanoguanidine is heated to melting for 10 minutes. On cooling, the product is dissolved in boiling methanol and poured into excess 1 N sodium hydroxide. The resulting mixture is diluted by addition of 300 ml. of water and then heated on a steam-bath one-half hour. Filtration yields a solid which is dissolved in ethanol for treatment with activated charcoal. Concentration in vacuo yields an oil which is crystallized from acetonitrile. Recrystallization from acetonitrile yields 2,4-diamino-6-[(3,4-dichlorobenzyl)propylamino]quinazoline; m.p. 203°–204° C.

We claim:

1. Benzylamino quinazolinyl formamidine compounds having in free base form the formula

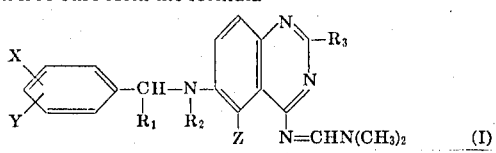

and pharmaceutically acceptable acid addition salts thereof, where $R_1$ is hydrogen or methyl, $R_2$ is hydrogen nitroso, formyl, acetyl, propionyl or $C_1$ to $C_3$ alkyl, $R_3$ represents amino or dimethylformamidino, and X, Y and Z independently represent hydrogen, chloro or methyl.

2. A compound according to claim 1 which is N'-{2-amino-6-[(3,4-dichlorobenzyl)methylamino]-4-quinazolinyl}-N,N-dimethylformamidine.

3. A compound according to claim 1 which is N'-{2-amino-6-[(3,4-dichlorobenzyl)nitrosamino]-4-quinazolinyl}-N,N-dimethylformamidine.

4. A compound according to claim 1 which is N',N'''-{6-[(3,4-dichlorobenzyl)methylamino]-2,4-quinazolinediyl}bis-[N,N-dimethylformamidine].

5. A compound according to claim 1 which is N',N'''-{6[(α-methylbenzyl)amino]-2,4-quinazolinediyl}bis[N,N-dimethylformamidine].

6. A compound according to claim 1 which is N',N'''-{6-[(3,4-dichlorobenzyl)nitrosamino]-2,4-quinazolinediyl}bis-[N,N-dimethylformamidine].

* * * * *